(12) United States Patent
Uenaka et al.

(10) Patent No.: US 7,355,630 B2
(45) Date of Patent: Apr. 8, 2008

(54) ANTI-SHAKE APPARATUS WITH POSITION DETECTING MAGNET

(75) Inventors: Yukio Uenaka, Tokyo (JP); Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 639 days.

(21) Appl. No.: 11/044,010

(22) Filed: Jan. 28, 2005

(65) Prior Publication Data

US 2005/0169619 A1   Aug. 4, 2005

(30) Foreign Application Priority Data

Jan. 30, 2004   (JP) ............................ P2004-023481

(51) Int. Cl.
*H04N 5/228* (2006.01)
*G03B 17/00* (2006.01)

(52) U.S. Cl. ............... 348/208.2; 348/208.7; 348/208.11; 396/55

(58) Field of Classification Search ........... 348/208.99, 348/208.2, 208.7, 208.11; 396/52, 53
See application file for complete search history.

(56) References Cited

U.S. PATENT DOCUMENTS

| | | | |
|---|---|---|---|
| 5,956,529 A * | 9/1999 | Lee et al. ............ | 396/55 |
| 5,974,269 A | 10/1999 | Sato et al. | |
| 2003/0067544 A1 | 4/2003 | Wada | |
| 2004/0201707 A1* | 10/2004 | Noguchi et al. ........ | 348/208.7 |

FOREIGN PATENT DOCUMENTS

| JP | 10-142647 | 5/1998 |
|---|---|---|
| JP | 2002-229090 | 8/2002 |
| JP | 2003-110919 | 4/2003 |

OTHER PUBLICATIONS

English language Abstract of JP 2002-229090.
English language Abstract of JP 2003-110919.
English language Abstract of JP 10-142647, filed May 29, 1998.

(Continued)

*Primary Examiner*—Ngoc-Yen Vu
*Assistant Examiner*—John Morehead
(74) *Attorney, Agent, or Firm*—Greenblum & Bernstein, P.L.C.

(57) ABSTRACT

An anti-shake apparatus of a photographing-apparatus comprises a movable-unit and a fixed-unit. The movable-unit has an imaging-device and a position-detecting magnet. The movable-unit can be moved in a first-direction and a second-direction. The fixed-unit has a hall-element unit. The first-direction is perpendicular to an optical-axis of a camera-lens of the photographing-apparatus. The second-direction is perpendicular to the optical-axis and the first-direction. The position-detecting magnet is used for detecting a first location in the first-direction of the movable-unit and a second location in the second-direction of the movable-unit, and has a front-surface which faces the hall-element unit. The hall-element unit has hall-elements which are used for detecting the first location, and has hall-elements which are used for detecting the second location, and faces the position-detecting magnet. The optical-axis passes through a center-area of the front-surface of the position-detecting magnet, when a center-area of the imaging-device is located on the optical-axis.

8 Claims, 9 Drawing Sheets

OTHER PUBLICATIONS

U.S. Appl. No. 11/044,055 to Uenaka et al, filed Jan. 28, 2005.
U.S. Appl. No. 11/044,054 to Uenaka, filed Jan. 28, 2005.
U.S. Appl. No. 11/065,577 to Uenaka, filed Feb. 25, 2005.
U.S. Appl. No. 11/065,354 to Uenaka et al., filed Feb. 25, 2005.
U.S. Appl. No. 11/073,638 to Uenaka et al., filed Mar. 8, 2005.
U.S. Appl. No. 11/073,604 to Uenaka, filed Mar. 8, 2005.
U.S. Appl. No. 11/071,234 to Uenaka, filed Mar. 4, 2005.
U.S. Appl. No. 11/071,220 to Uenaka et al., filed Mar. 4, 2005.
U.S. Appl. No. 11/071,241 to Uenaka, filed Mar. 4, 2005.
U.S. Appl. No. 11/071,242 to Uenaka, filed Mar. 4, 2005.
U.S. Appl. No. 11/078,367 to Seo, filed Mar. 14, 2005.

* cited by examiner

ANTI-SHAKE APPARATUS WITH POSITION DETECTING MAGNET

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or the imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, the permanent magnet for position-detecting, the hall element, and the yoke are attached to the edge of the movable unit or the fixed unit. Therefore, when rattling occurs due to gaps or loose connections etc. between mechanical members for driving the movable unit, the movement quantity of the hand-shake correcting lens (or the imaging device) in the movable unit differs to that of the member (the hall element in this patent publication) for detecting the position of the movable unit.

SUMMARY OF THE INVENTION

Therefore, an object of the present invention is to provide an apparatus which can accurately detect positions even if rattling due to gaps or loose connections etc. occurs in the mechanical members of the anti-shake apparatus.

According to the present invention, an anti-shake apparatus of a photographing apparatus comprises a movable unit and a fixed unit.

The movable unit has an imaging device and a position-detecting magnet. The movable unit can be moved in a first direction and a second direction.

The fixed unit has a magnetic-field change-detecting unit.

The first direction is perpendicular to an optical axis of a camera lens of the photographing apparatus.

The second direction is perpendicular to the optical axis and the first direction.

The position-detecting magnet is used for detecting a first location in the first direction of the movable unit and a second location in the second direction of the movable unit, and has a front-surface which faces the magnetic-field change-detecting unit.

The magnetic-field change-detecting unit has first and second horizontal magnetic-field change-detecting elements which are used for detecting the first location in the first direction of the movable unit, and has first and second vertical magnetic-field change-detecting elements which are used for detecting the second location in the second direction of said movable unit, and faces the position-detecting magnet.

The optical axis passes through a center area of the front-surface of the position-detecting magnet, when a center area of the imaging device is located on the optical axis.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings. In this embodiment, the photographing apparatus 1 is a digital camera. The photographing apparatus 1 has an optical axis LX.

Figure 1:
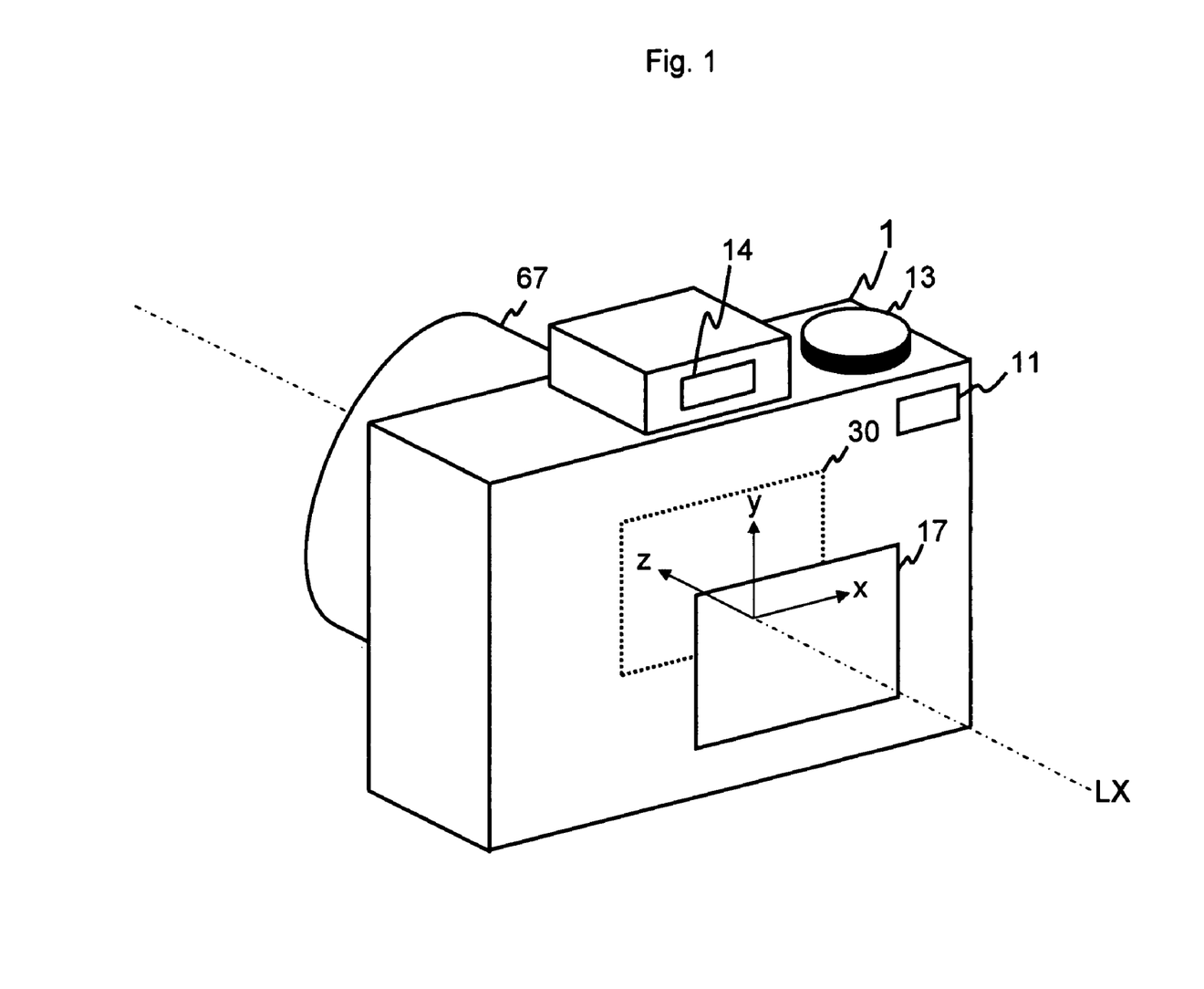
FIG. 1 is a perspective view of a photographing apparatus of the embodiment viewed from the back side of the photographing apparatus.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
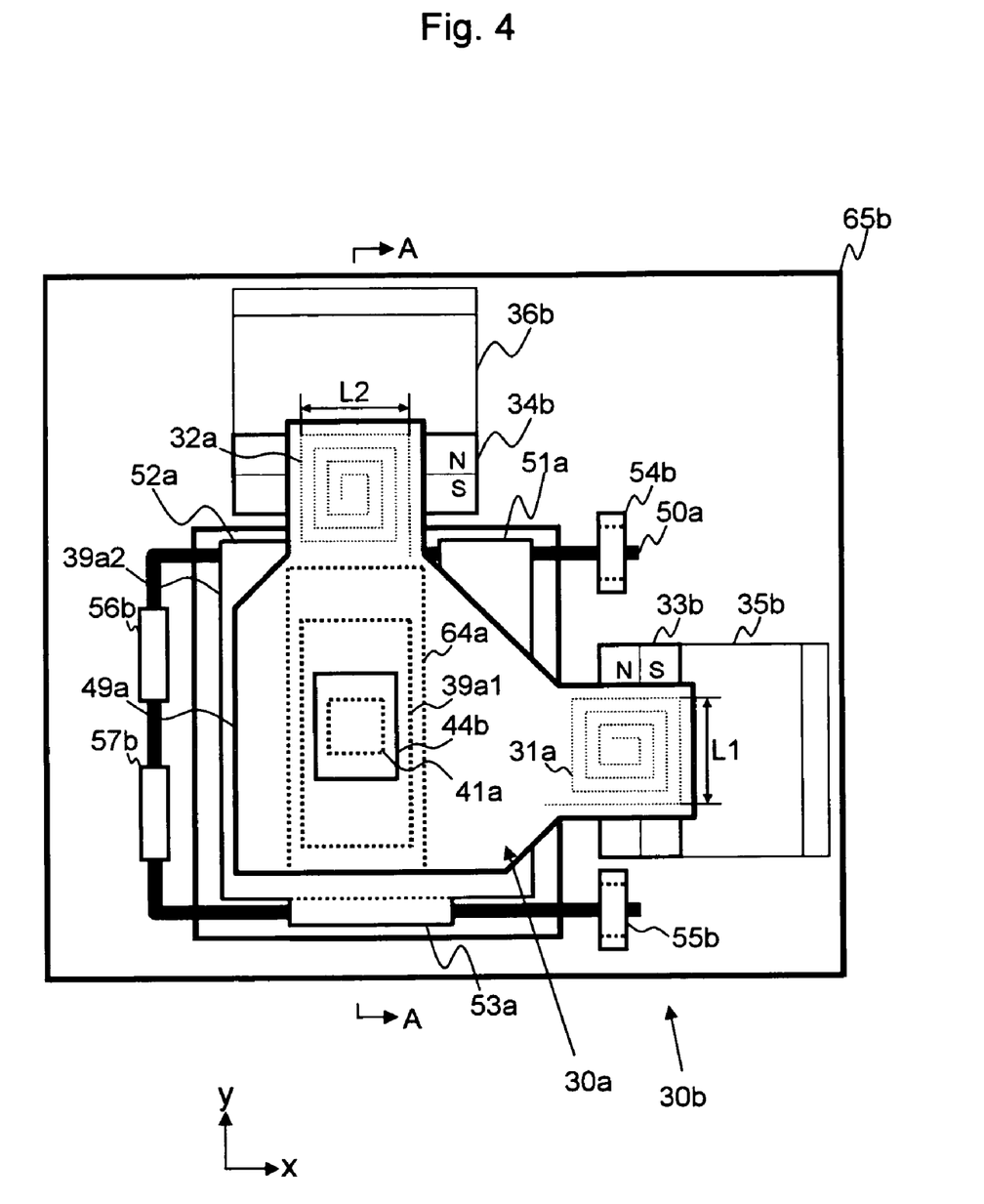
FIG. 4 is a figure showing the construction of the anti-shake apparatus.
Figure 5:
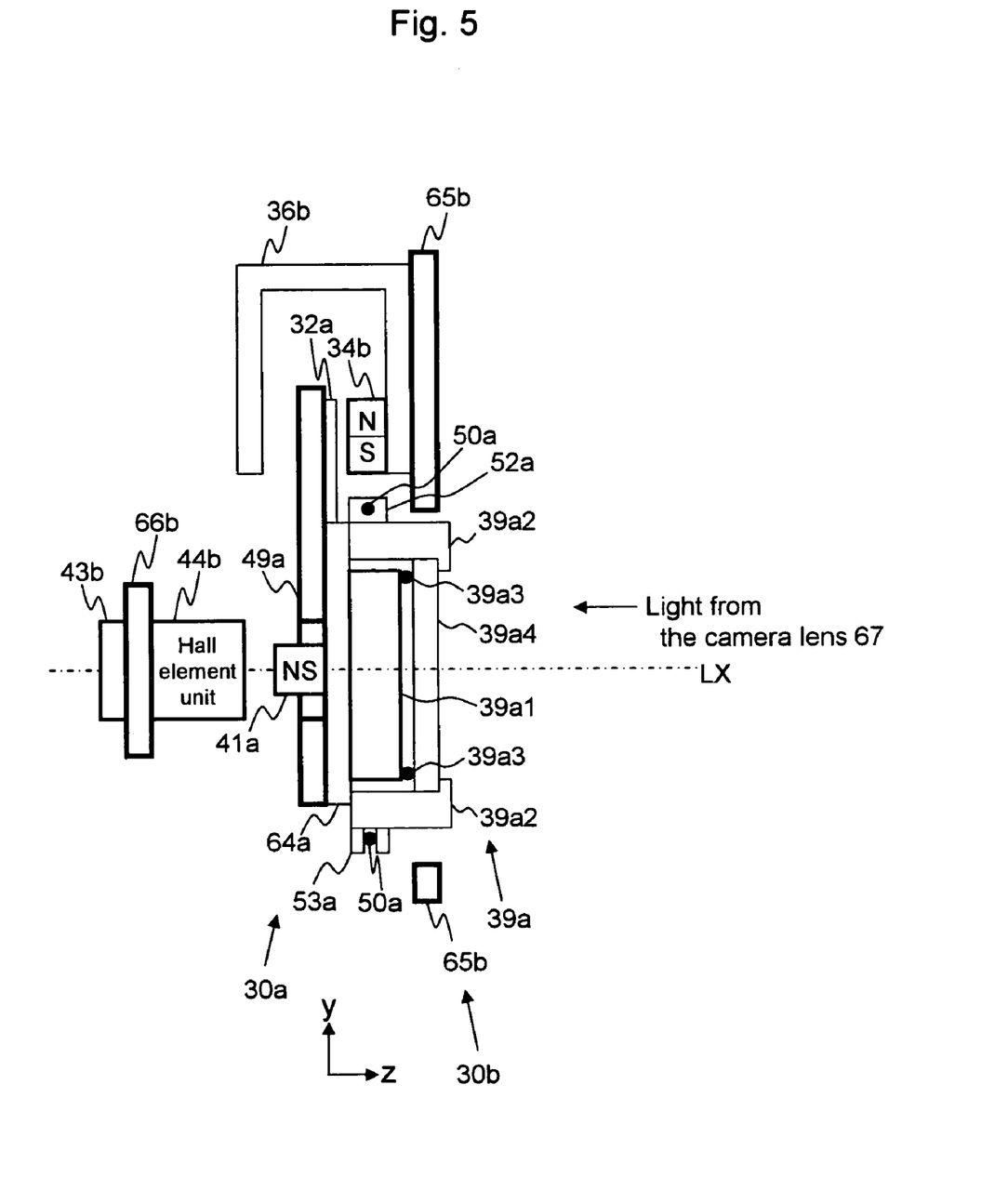
FIG. 5 is a view along line A-A of FIG. 4.

FIG. 5 shows a construction diagram of the section along line A-A of FIG. 4. The sensor circuit board 66b and the position-detecting yoke 43b are not depicted in FIG. 4.

Figure 2:
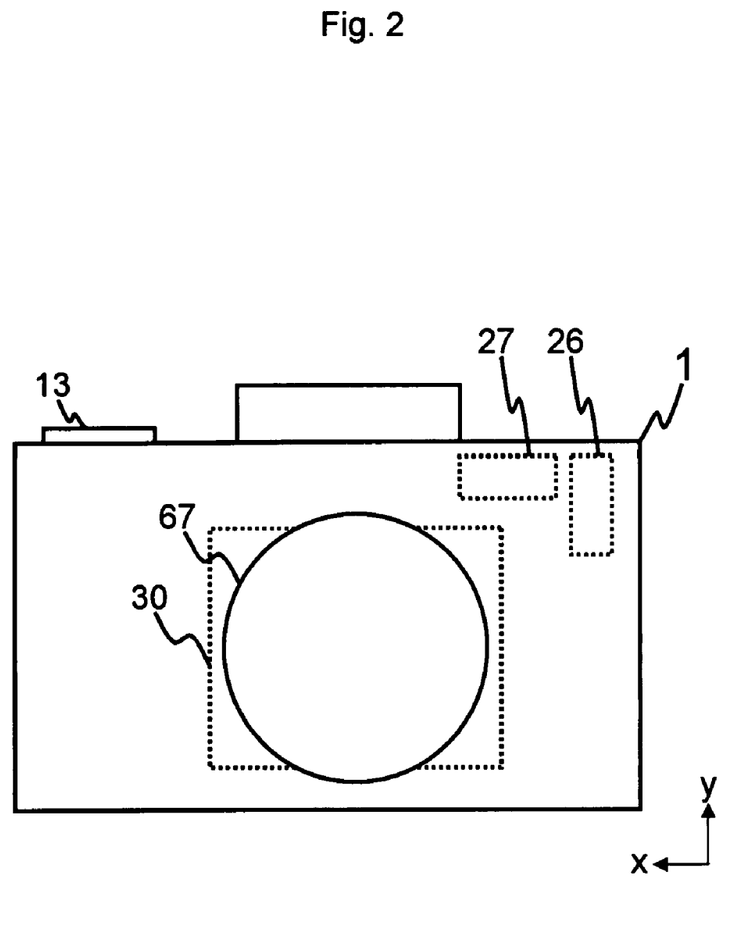
FIG. 2 is a front view of the photographing apparatus.
Figure 3:
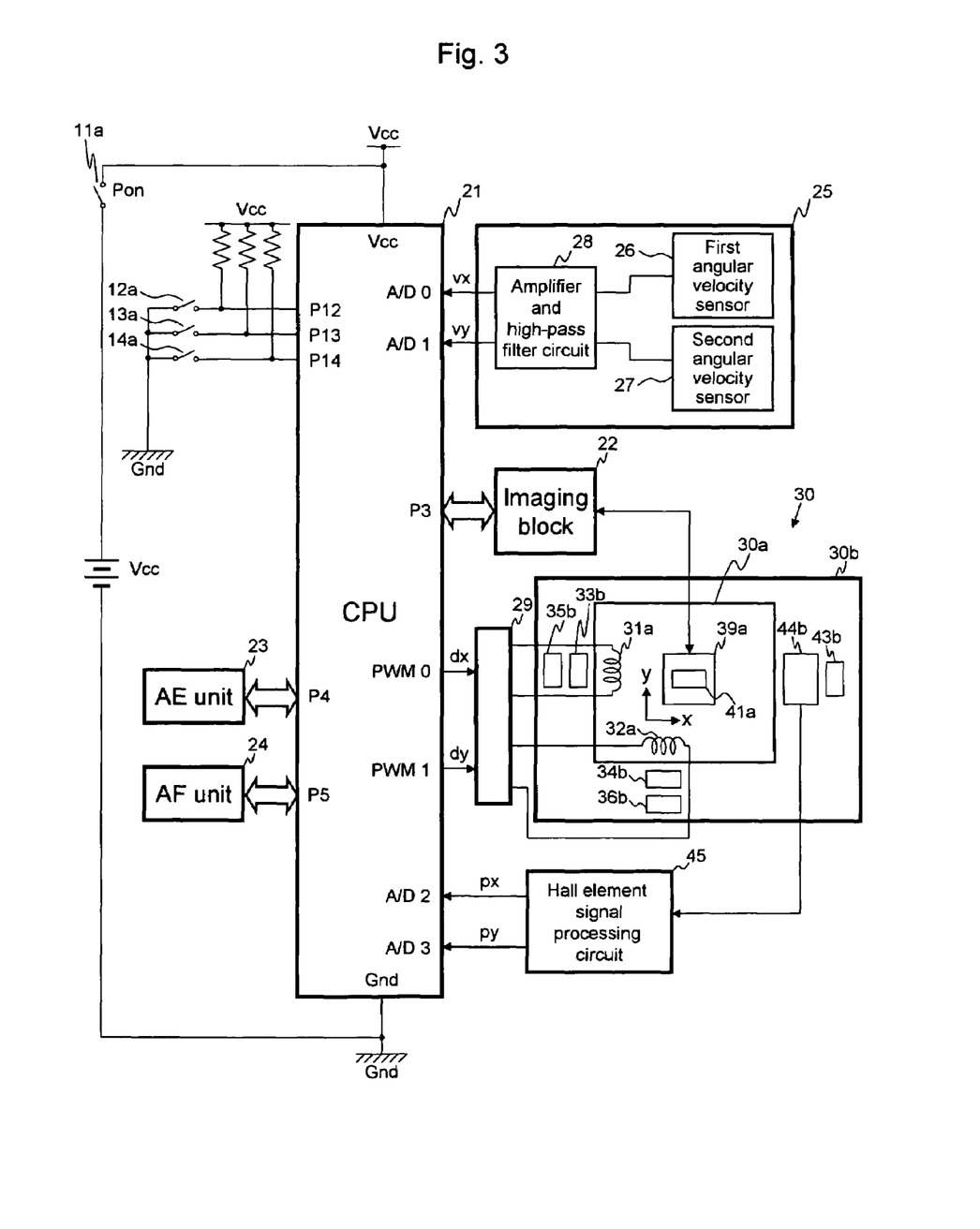
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, a CPU 21, an imaging block 22, an AE (automatic exposure) unit 23, an AF (automatic focusing) unit 24, an imaging unit 39a in the anti-shake apparatus 30, and a camera lens 67 (see FIGS. 1, 2, and 3).

Whether the Pon switch 11a is in the on state or the off state, is determined by a state of the Pon button 11, so that the ON/OFF states of the photographing apparatus 1 are changed corresponding to the ON/OFF states of the Pon switch 11a.

The photographic subject image is taken as an optical image through the camera lens 67 by the imaging block 22, which drives the imaging unit 39a, so that the image, which is taken, is indicated on the LCD monitor 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake apparatus 30, a hall-element signal-processing circuit 45, and the camera lens 67.

When the anti-shake button 14 is fully pushed by the operator, the anti-shake switch 14a changes to the on state, so that the anti-shake operation is performed where the angular velocity detecting unit 25 and the anti-shake apparatus 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the driver circuit 29, the anti-shake apparatus 30, and the hall-element signal-processing circuit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved, corresponding to the hand-shake quantity which is calculated, for the first direction x and the second direction y. The location in the first direction x of the position S is defined as sx, and the location in the second direction y of the position S is defined as sy. The movement of the movable unit 30a, which includes the imaging unit 39a, is performed by using electro-magnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake apparatus 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake apparatus 30 has a movable unit 30a, which includes the imaging unit 39a, and a fixed unit 30b. Or, the anti-shake apparatus 30 is composed of a driving part which moves the movable unit 30a by electro-magnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

The driving of the movable unit 30a of the anti-shake apparatus 30, is performed by the driver circuit 29 which has the first PWM duty dx input from the PWM 0 of the CPU 21 and has the second PWM duty dy input from the PWM 1 of the CPU 21. The detected-position P of the movable unit 30a either before moving or after moving, which is moved by driving the driver circuit 29, is detected by the hall element unit 44b and the hall-element signal-processing circuit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a position-detecting magnet 41a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4 and 5).

The members, which are included in the movable unit 30a and need electrical power, are connected to the fixed unit 30b etc., through the flexible circuit board (not depicted).

For example, when the position-detecting magnet 41a is an electromagnet, the position-detecting magnet 41a has to be electrically connected with the fixed unit 30b etc.

Conversely, when the position-detecting magnet 41a is a permanent magnet, the position-detecting magnet 41a does not have to be electrically connected with the fixed unit 30b etc. Therefore, it is possible to simplify electrical connections, and restrain external forces on the movable unit 30a, because electrical connections for position-detecting between the movable unit 30a and the fixed unit 30b, are not needed.

The fixed unit 30b has a first permanent driving magnet 33b, a second permanent driving magnet 34b, a first driving yoke 35b, a second driving yoke 36b, a position-detecting yoke 43b, a hall element unit 44b, a first bearing unit for vertical movement 54b, a second bearing unit for vertical movement 55b, a third bearing unit for vertical movement 56b, a fourth bearing unit for vertical movement 57b, a base board 65b, and a sensor circuit board 66b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

When the center area of the imaging device 39a1 is located on the optical axis LX of the camera lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In this embodiment, the center of the imaging device 39a1 is the crossing point of these two diagonal lines.

The imaging unit 39a, the plate 64a, the movable circuit board 49a, and the position-detecting magnet 41a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the position-detecting magnet 41a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by a first electro-magnetic force. The lines which are parallel to the second direction y, are used for moving the movable unit 30a in the first direction x. The lines which are parallel to the second direction y, have a first effective length L1.

The first electromagnetic force occurs on the basis of the current direction of the first driving coil 31a and the magnetic-field direction of the first permanent driving magnet 33b.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by a second electromagnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a and the magnetic-field direction of the second permanent driving magnet 34b.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The position-detecting magnet 41a is used for detecting the first location in the first direction x of the movable unit 30a and the second location in the second direction y of the movable unit 30a.

The position-detecting magnet 41a is attached to the plate 64a, under the condition where the N pole and S pole are arranged in the third direction z. The position-detecting magnet 41a has a front-surface, which faces the fixed unit 30b and is a square having peripheral sides which are parallel to one of the first direction x and the second direction y.

Because the front-surface of the position-detecting magnet 41a, which faces the fixed unit 30b, is square shaped, detecting the position of the movable unit 30a in the first direction x is not influenced by movement of the movable unit 30a in the second direction y. Further, detecting the position of the movable unit 30a in the second direction y is not influenced by movement of the movable unit 30a in the first direction x.

The position-detecting magnet 41a is attached to the plate 64a such that the optical axis LX of the camera lens 67 passes through the center area of the square front-surface of the position-detecting magnet 41a, when the movable unit 30a is in the center of its movement range (the center area of the imaging device 39a1 is located on the optical axis LX).

Therefore, even if rattling occurs due to gaps or loose connections etc. between the mechanical members, the movement quantity of the imaging device 39a1 in the movable unit 30a is the same as that of the member for position detecting in the movable unit 30a. In other words, the movement quantity of these members is the same as that of the position-detecting magnet 41a.

The position-detecting magnet 41a is in contact with the plate 64a. In the case where the position-detecting magnet 41a is a permanent magnet, the permanent magnet is in contact with the plate 64a. In the case where the position-detecting magnet 41a is an electromagnet, a magnetic material which has a magnetic core, is in contact with the plate 64a. Or, the position-detecting magnet 41a and the imaging device 39a1 hold the plate 64a in the third direction z.

Therefore, when the plate 64a is made of a metallic material, the heat, which the imaging device 39a1 emits, is radiated by the plate 64a and the permanent magnet of the position-detecting magnet 41a or the magnetic material which forms the magnetic core of the electromagnet of the position-detecting magnet 41a. In this case, the ability to radiate heat is improved, because the surface area, which is able to radiate heat, is increased due to the position-detecting magnet 41a.

Further, when the position-detecting magnet 41a is a permanent magnet, and the plate 64a is a magnetic material which is attracted by the magnetic force from the position-detecting magnet 41a, for example iron, nickel etc., the position-detecting magnet 41a can be simply attached to the plate 64a because of the magnetic force.

Further, the position detecting operation in the first direction x by using the first horizontal hall element hh1 and the second horizontal hall element hh2, and the position detecting operation in the second direction y by using the first vertical hall element hv1 and the second vertical hall element hv2 can be performed by using the same position-detecting magnet 41a.

Accordingly, the driving magnet and the position-detecting magnet can be made small in comparison with when the position-detecting operation in the first direction x and the position-detecting operation in the second direction y are respectively performed by using different magnets, or when the position-detecting operation in the first direction x and the driving operation for driving the movable unit in the first direction x are performed by using the same magnet, or when the position-detecting operation in the second direction y and the driving operation for driving the movable unit in the second direction y are performed by using the same magnet.

Similarly, the driving yoke and the position-detecting yoke can to be small.

Therefore, the driving coils can be arranged in the vacant space of the movable unit 30a, and the driving magnets can be arranged in the vacant space of the fixed unit 30b, so that the anti-shake apparatus 30 can be compact.

The first permanent driving magnet 33b is attached to the movable unit side of the fixed unit 30b, where the first permanent driving magnet 33b faces the first driving coil 31a in the third direction z.

The second permanent driving magnet 34b is attached to the movable unit side of the fixed unit 30b, where the second permanent driving magnet 34b faces the second driving coil 32a in the third direction z.

The hall element unit 44b is attached to the movable unit side of the fixed unit 30b, where the hall element unit 44b faces the position-detecting magnet 41a.

The position-detecting yoke 43b is attached to a back surface side of the fixed unit 30b, which is the opposite side to the surface having the hall element unit 44b. The position-detecting yoke 43b is made of a magnetic material, and raises the magnetic-flux density between the position-detecting magnet 41a and the hall element unit 44b.

The first permanent driving magnet 33b is attached to the first driving yoke 35b, under the condition where N pole and S pole are arranged in the first direction x. The first driving yoke 35b is attached to the base board 65b of the fixed unit 30b, on the side of the movable unit 30a, in the third direction z.

The length of the first permanent driving magnet 33b in the second direction y, is longer in comparison with the first effective length L1 of the first driving coil 31a. The magnetic-field which influences the first driving coil 31a, is not changed during movement of the movable unit 30a in the second direction y.

The second permanent driving magnet 34b is attached to the second driving yoke 36b, under the condition where N pole and S pole are arranged in the second direction y. The second driving yoke 36b is attached to the base board 65b of the fixed unit 30b, on the side of the movable unit 30a, in the third direction z.

The length of the second permanent driving magnet 34b in the first direction x, is longer in comparison with the second effective length L2 of the second driving coil 32a.

The magnetic-field which influences the second driving coil 32a, is not changed during movement of the movable unit 30a in the first direction x.

The first driving yoke 35b is made of a soft magnetic material, and forms a square-u-shaped channel when viewed from the second direction y. The first permanent driving magnet 33b and the first driving coil 31a are inside the channel of the first driving yoke 35b.

The side of the first driving yoke 35b, which contacts the first permanent driving magnet 33b, prevents the magnetic-field of the first permanent driving magnet 33b from leaking to the surroundings.

The other side of the first driving yoke 35b, which faces the first permanent driving magnet 33b, the first driving coil 31a, and the movable circuit board 49a, raises the magnetic-flux density between the first permanent driving magnet 33b and the first driving coil 31a.

The second driving yoke 36b is made of a soft magnetic material, and forms a square-u-shaped channel when viewed from the first direction x. The second permanent driving magnet 34b and the second driving coil 32a are inside the channel of the second driving yoke 36b.

The side of the second driving yoke 36b, which contacts the second permanent driving magnet 34b, prevents the magnetic-field of the second permanent driving magnet 34b from leaking to the surroundings.

The other side of the second driving yoke 36b, which faces the second permanent driving magnet 34b, the second driving coil 32a, and the movable circuit board 49a, raises the magnetic-flux density between the second permanent driving magnet 34b and the second driving coil 32a.

Figure 9:
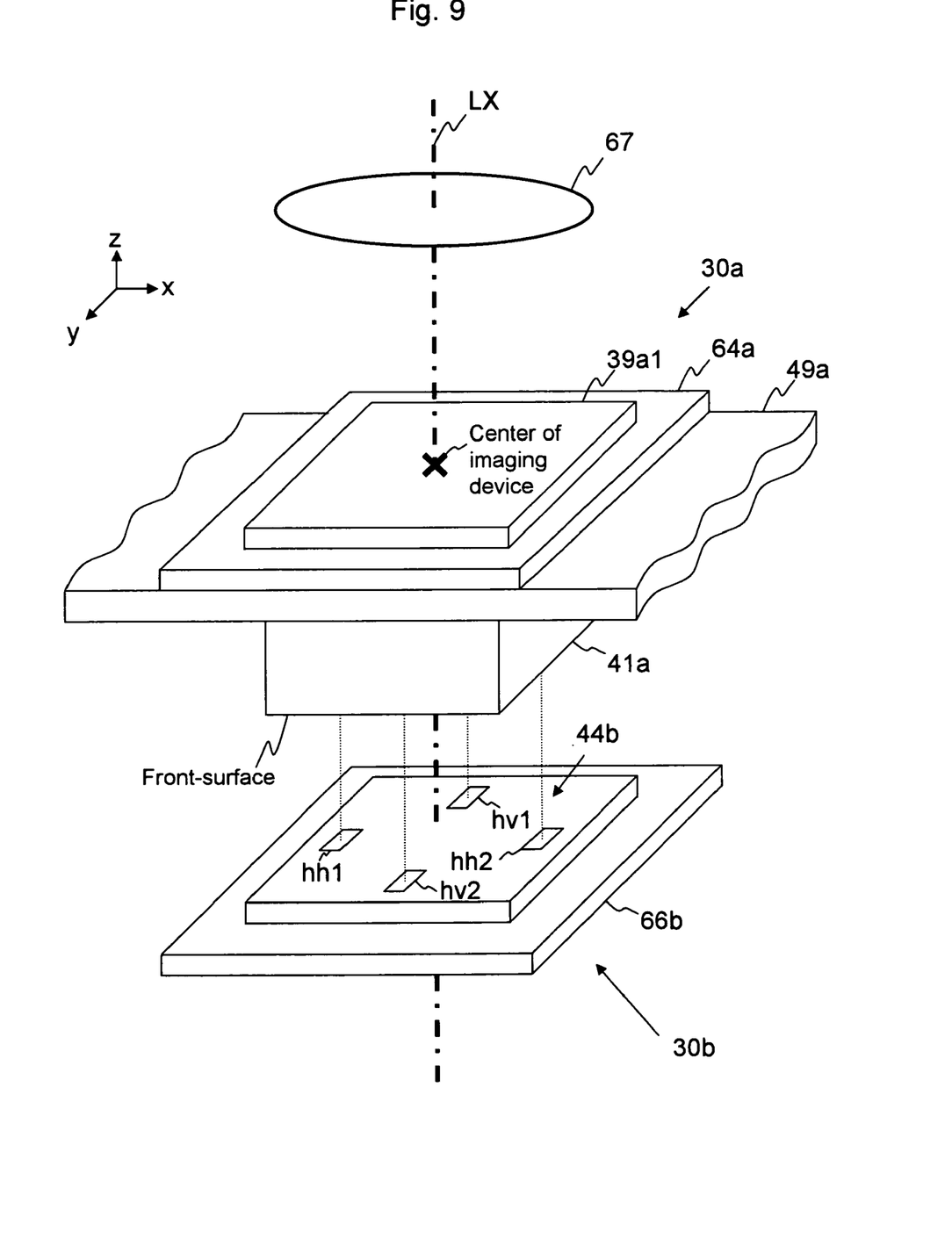
FIG. 9 is a perspective view of the movable unit and the fixed unit.

The hall element unit 44b is a two-axes hall element which has four hall elements that are magnetoelectric converting elements (magnetic-field change-detecting elements) using the hall effect (see FIG. 9). The hall element unit 44b detects the first detected-position signal px, which is used for specifying the first location in the first direction x for the present position P of the movable unit 30a, and the second detected-position signal py, which is used for specifying the second location in the second direction y for the present position P of the movable unit 30a.

Two of the four hall elements are a first horizontal hall element hh1 and a second horizontal hall element hh2 for detecting the first location in the first direction x, so that the others are a first vertical hall element hv1 and a second vertical hall element hv2 for detecting the second location in the second direction y.

An input terminal of the first horizontal hall element hh1 and an input terminal of the second horizontal hall element hh2 are connected in series, in order to detect the first location in the first direction x of the movable unit 30a. The first horizontal hall element hh1 and the second horizontal hall element hh2 are attached to the sensor circuit board 66b of the fixed unit 30b, under the condition where the first horizontal hall element hh1 and the second horizontal hall element hh2 face the position-detecting magnet 41a of the movable unit 30a, in the third direction z.

When the center of the imaging device 39a1, passes through the optical axis LX (see FIG. 9), it is desirable that the first horizontal hall element hh1 is located at a place on the hall element unit 44b which faces midway along a side of the square front-surface, in the second direction y, of the position-detecting magnet 41a, the second horizontal hall element hh2 is located at a place on the hall element unit 44b which faces midway along the other side of the square front-surface, in the second direction y, of the position-detecting magnet 41a (the square front-surface facing the hall element unit 44b, viewed from the third direction z), to perform the position-detecting operation utilizing the full size of the square front-surface of the position-detecting magnet 41a.

An input terminal of the first vertical hall element hv1 and an input terminal of the second vertical hall element hv2 are connected in series, in order to detect the second location in the second direction y of the movable unit 30a. The first vertical hall element hv1 and the second vertical hall element hv2 are attached to the sensor circuit board 66b of the fixed unit 30b, under the condition where the first vertical hall element hv1 and the second vertical hall element hv2 face the position-detecting magnet 41a of the movable unit 30a, in the third direction z.

When the center of the imaging device 39a1, passes through the optical axis LX, it is desirable that the first vertical hall element hv1 is located at a place on the hall element unit 44b which faces midway along a side of the square front-surface, in the first direction x, of the position-detecting magnet 41a, the second vertical hall element hv2 is located at a place on the hall element unit 44b which faces midway along the other side of the square front-surface, in the first direction x, of the position-detecting magnet 41a (the square front-surface facing the hall element unit 44b, viewed from the third direction z), to perform the position-detecting operation utilizing the full size of the square front-surface of the position-detecting magnet 41a.

Both the base board 65b and the sensor circuit board 66b are plate state members which become the base for attaching the hall element unit 44b etc., and are arranged being parallel to the imaging surface of the imaging device 39a1. The sensor circuit board 66b is positioned such that the position-detecting magnet 41a is between the sensor circuit board 66b and the imaging device 39a1 in the third direction z (see FIG. 9).

In this embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second driving coils 31a and 32a are arranged on the opposite side of the movable circuit board 49a to the camera lens 67, so that the first and second permanent driving magnets 33b and 34b are arranged on the same side of the movable circuit board 49a as the camera lens 67.

Figure 6:
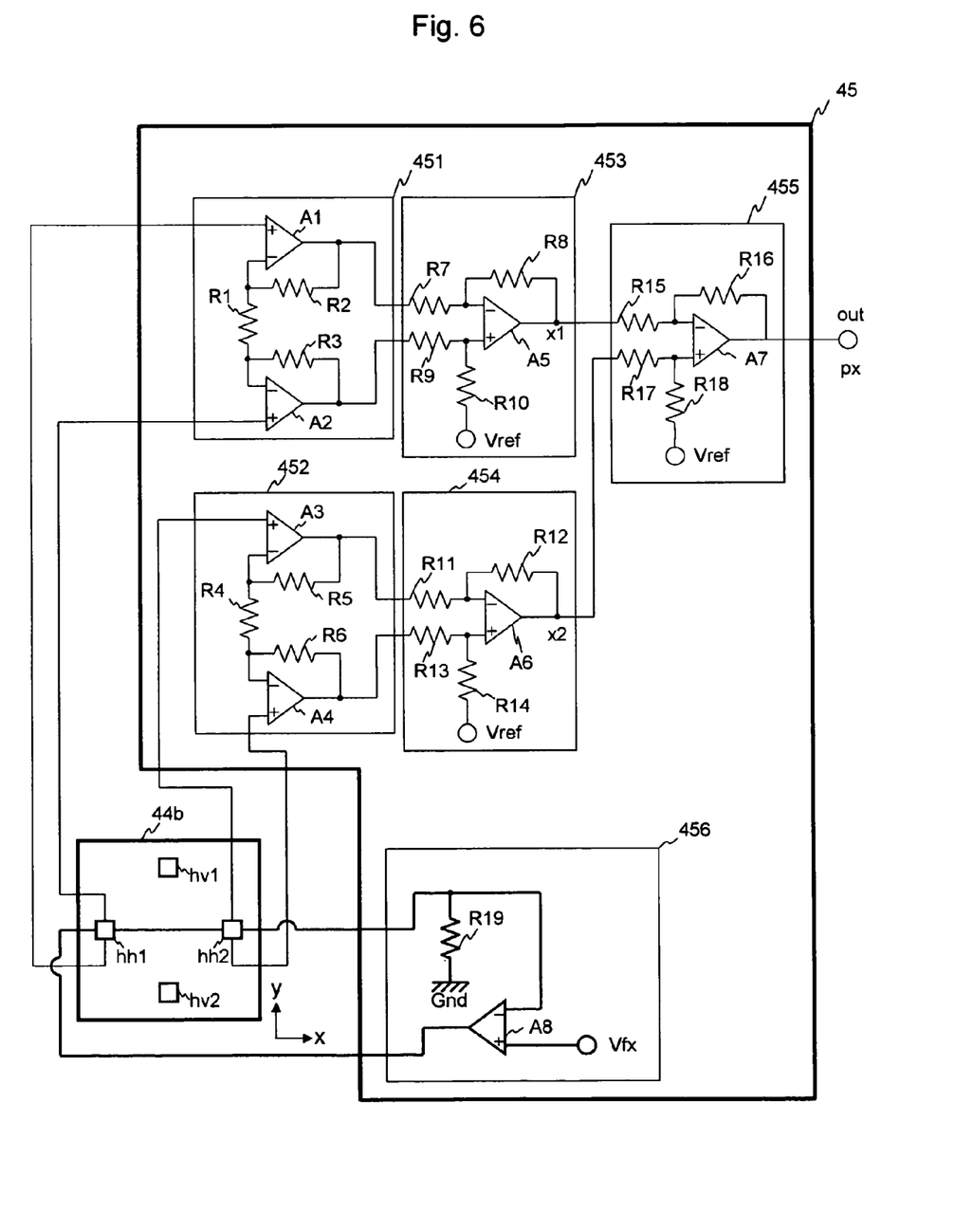
FIG. 6 is a circuit construction diagram of the part of the circuit for detecting the first location in the first direction of the movable unit, with the two-axes hall element and the hall-element signal-processing circuit.

The hall-element signal-processing circuit 45 detects a first horizontal potential-difference x1 between output terminals of the first horizontal hall element hh1, based on an output signal of the first horizontal hall element hh1.

The hall-element signal-processing circuit 45 detects a second horizontal potential-difference x2 between output terminals of the second horizontal hall element hh2, based on an output signal of the second horizontal hall element hh2.

The hall-element signal-processing circuit 45 outputs the first detected-position signal px, which specifies the first location in the first direction x of the movable unit 30a, to the A/D converter A/D 2 of the CPU 21, on the basis of the first and second horizontal potential-differences x1 and x2.

Figure 7:
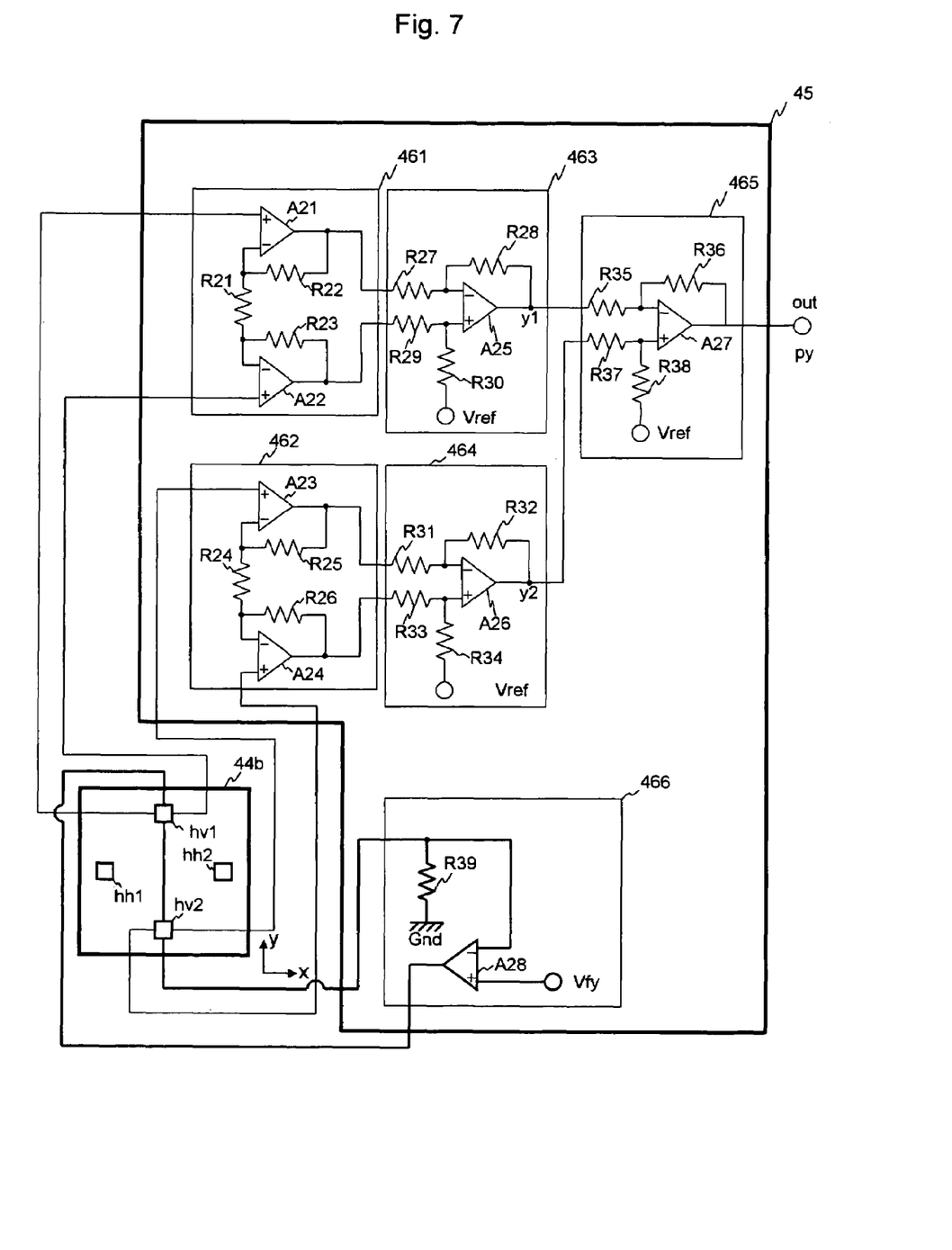
FIG. 7 is a circuit construction diagram of the part of the circuit for detecting the second location in the second direction of the movable unit, with the two-axes hall element and the hall-element signal-processing circuit.

The hall-element signal-processing circuit 45 detects a first vertical potential-difference y1 between output terminals of the first vertical hall element hv1, based on an output signal of the first vertical hall element hv1.

The hall-element signal-processing circuit 45 detects a second vertical potential-difference y2 between output terminals of the second vertical hall element hv2, based on an output signal of the second vertical hall element hv2.

The hall-element signal-processing circuit 45 outputs the second detected-position signal py, which specifies the second location in the second direction y of the movable unit 30a, to the A/D converter A/D 3 of the CPU 21, on the basis of the first and second vertical potential-differences y1 and y2.

The circuit construction regarding input/output signals of the first and second horizontal hall elements hh1 and hh2, in the hall-element signal-processing circuit 45 is explained using FIG. 6. The circuit construction regarding the first and second vertical hall elements hv1 and hv2 is omitted in FIG. 6, in order to simplify the explanation.

The circuit construction regarding input/output signals of the first and second vertical hall elements hv1 and hv2, in the hall-element signal-processing circuit 45 is explained using FIG. 7. The circuit construction regarding the first and second horizontal hall elements hh1 and hh2 is omitted in FIG. 7, in order to simplify the explanation.

The hall-element signal-processing circuit 45 has a circuit 451, a circuit 452, a circuit 453, a circuit 454, and a circuit 455, for controlling the output of the first and second horizontal hall elements hh1 and hh2, and has a circuit 456, for controlling the input of the first and second horizontal hall elements hh1 and hh2.

The hall-element signal-processing circuit 45 has a circuit 461, a circuit 462, a circuit 463, a circuit 464, and a circuit 466, for controlling the output of the first and second vertical hall elements hv1 and hv2, and has a circuit 466, for controlling the input of the first and second vertical hall elements hv1 and hv2.

Both output terminals of the first horizontal hall element hh1 are connected with the circuit 451, so that the circuit 451 is connected with the circuit 453.

Both output terminals of the second horizontal hall element hh2 are connected with the circuit 452, so that the circuit 452 is connected with the circuit 454.

The circuits 453 and 454 are connected with the circuit 455.

The circuit 451 is a differential amplifier circuit which amplifies the signal difference between the output terminals of the first horizontal hall element hh1, so that the circuit 452 is a differential amplifier circuit which amplifies the signal difference between the output terminals of the second horizontal hall element hh2.

The circuit 453 is a subtracting circuit which calculates the first horizontal potential-difference x1 on the basis of the difference between the amplified signal difference from the circuit 451 and a reference voltage Vref.

The circuit 454 is a subtracting circuit which calculates the second horizontal potential-difference x2 on the basis of the difference between the amplified signal difference from the circuit 452 and the reference voltage Vref.

The circuit 455 is a subtracting amplifier circuit which calculates the first detected-position signal px by multiplying a predetermined amplification rate by the difference between the first horizontal potential-difference x1 and the second horizontal potential-difference x2.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the output terminals of the first horizontal hall element hh1 is connected with the non-inverting input terminal of the operational amplifier A1, so that the other terminal of the first horizontal hall element hh1 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 452 has a resistor R4, a resistor R5, a resistor R6, an operational amplifier A3, and an operational amplifier A4. The operational amplifier A3 has an inverting input terminal, a non-inverting input terminal, and an output terminal. The operational amplifier A4 has an inverting input terminal, a non-inverting input terminal, and an output terminal.

One of the output terminals of the second horizontal hall element hh2 is connected with the non-inverting input terminal of the operational amplifier A3, so that the other terminal of the second horizontal hall element hh2 is connected with the non-inverting input terminal of the operational amplifier A4.

The inverting input terminal of the operational amplifier A3 is connected with the resistors R4 and R5, so that the inverting input terminal of the operational amplifier A4 is connected with the resistor R4 and R6.

The output terminal of the operational amplifier A3 is connected with the resistor R5 and the resistor R11 in the circuit 454. The output terminal of the operational amplifier A4 is connected with the resistor R6 and the resistor R13 in the circuit 454.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8 and the resistor R15 in the circuit 455. The first horizontal potential-difference x1 is output from the output terminal of the operational amplifier A5. One of the terminals of the resistor R10 is connected with the power supply whose voltage is the reference voltage Vref.

The circuit 454 has a resistor R11, a resistor R12, a resistor R13, a resistor R14, and an operational amplifier A6. The operational amplifier A6 has an inverting input terminal, a non-inverting input terminal, and an output terminal.

The inverting input terminal of the operational amplifier A6 is connected with the resistors R11 and R12. The non-inverting input terminal of the operational amplifier A6 is connected with the resistors R13 and R14. The output terminal of the operational amplifier A6 is connected with the resistor R12 and the resistor R17 in the circuit 455. The second horizontal potential-difference x2 is output from the output terminal of the operational amplifier A6. One of the terminals of the resistor R14 is connected with the power supply whose voltage is the reference voltage Vref.

The circuit 455 has a resistor R15, a resistor R16, a resistor R17, a resistor R18, and an operational amplifier A7.

The operational amplifier A7 has an inverting input terminal, a non-inverting input terminal, and an output terminal.

The inverting input terminal of the operational amplifier A7 is connected with the resistors R15 and R16. The non-inverting input terminal of the operational amplifier A7 is connected with the resistors R17 and R18. The output terminal of the operational amplifier A7 is connected with the resistor R16. The first detected-position signal px, obtained by multiplying a predetermined amplification rate by the difference between the first horizontal potential-difference x1 and the second horizontal potential-difference x2, is output from the output terminal of the operational amplifier A7. One of the terminals of the resistor R18 is connected with the power supply whose voltage is the reference voltage Vref.

The values of the resistors R1 and R4 are the same. The values of the resistors R2, R3, R5, and R6 are the same. The values of the resistors R7~R14 are the same. The values of the resistors R15 and R17 are the same. The values of the resistors R16 and R18 are the same.

This predetermined amplification rate is based on the values of the resistors R15~R18.

The operational amplifiers A1~A4 are the same type of amplifier. The operational amplifiers A5 and A6 are the same type of amplifier.

The circuit 456 has a resistor R19 and an operational amplifier A8. The operational amplifier A8 has an inverting input terminal, a non-inverting input terminal, and an output terminal.

The inverting input terminal of the operational amplifier A8 is connected with the resistor R19 and one of the input terminals of the second horizontal hall element hh2. The potential of the non-inverting input terminal of the operational amplifier A8 is set at voltage Vfx corresponding to the value of the current which passes through the input terminals of the first and second horizontal hall elements hh1 and hh2. The output terminal of the operational amplifier A8 is connected with the one of the input terminals of the first horizontal hall element hh1. The input terminal of the first horizontal hall element hh1 and the input terminal of the second horizontal hall element hh2 are connected in series. One of the terminals of the resistor R19 is grounded.

Both output terminals of the first vertical hall element hv1 are connected with the circuit 461, so that the circuit 461 is connected with the circuit 463.

Both output terminals of the second vertical hall element hv2 are connected with the circuit 462, so that the circuit 462 is connected with the circuit 464.

The circuits 463 and 464 are connected with the circuit 465.

The circuit 461 is a differential amplifier circuit which amplifies the signal difference between the output terminals of the first vertical hall element hv1, so that the circuit 462 is a differential amplifier circuit which amplifies the signal difference between the output terminals of the second vertical hall element hv2.

The circuit 463 is a subtracting circuit which calculates the first vertical potential-difference y1 on the basis of the difference between the amplified signal difference from the circuit 461 and the reference voltage Vref.

The circuit 464 is a subtracting circuit which calculates the second vertical potential-difference y2 on the basis of the difference between the amplified signal difference from the circuit 462 and the reference voltage Vref.

The circuit 465 is a subtracting amplifier circuit which calculates the second detected-position signal py by multiplying a predetermined amplification rate by the difference between the first vertical potential-difference y1 and the second vertical potential-difference y2.

The circuit 461 has a resistor R21, a resistor R22, a resistor R23, an operational amplifier A21, and an operational amplifier A22. The operational amplifier A21 has an inverting input terminal, a non-inverting input terminal, and an output terminal. The operational amplifier A22 has an inverting input terminal, a non-inverting input terminal, and an output terminal.

One of the output terminals of the first vertical hall element hv1 is connected with the non-inverting input terminal of the operational amplifier A21, so that the other terminal of the first vertical hall element hv1 is connected with the non-inverting input terminal of the operational amplifier A22.

The inverting input terminal of the operational amplifier A21 is connected with the resistors R21 and R22, so that the inverting input terminal of the operational amplifier A22 is connected with the resistors R21 and R23.

The output terminal of the operational amplifier A21 is connected with the resistor R22 and the resistor R27 in the circuit 463. The output terminal of the operational amplifier A22 is connected with the resistor R23 and the resistor R29 in the circuit 463.

The circuit 462 has a resistor R24, a resistor R25, a resistor R26, an operational amplifier A23, and an operational amplifier A24. The operational amplifier A23 has an inverting input terminal, a non-inverting input terminal, and an output terminal. The operational amplifier A24 has an inverting input terminal, a non-inverting input terminal, and an output terminal.

One of the output terminals of the second vertical hall element hv2 is connected with the non-inverting input terminal of the operational amplifier A23, so that the other terminal of the second vertical hall element hv2 is connected with the non-inverting input terminal of the operational amplifier A24.

The inverting input terminal of the operational amplifier A23 is connected with the resistors R24 and R25, so that the inverting input terminal of the operational amplifier A24 is connected with the resistor R24 and R26.

The output terminal of the operational amplifier A23 is connected with the resistor R25 and the resistor R31 in the circuit 464. The output terminal of the operational amplifier A24 is connected with the resistor R26 and the resistor R33 in the circuit 464.

The circuit 463 has a resistor R27, a resistor R28, a resistor R29, a resistor R30, and an operational amplifier A25. The operational amplifier A25 has an inverting input terminal, a non-inverting input terminal, and an output terminal.

The inverting input terminal of the operational amplifier A25 is connected with the resistors R27 and R28. The non-inverting input terminal of the operational amplifier A25 is connected with the resistors R29 and R30. The output terminal of the operational amplifier A25 is connected with the resistor R28 and the resistor R35 in the circuit 465. The first vertical potential-difference y1 is output from the output terminal of the operational amplifier A25. One of the terminals of the resistor R30 is connected with the power supply whose voltage is the reference voltage Vref.

The circuit 464 has a resistor R31, a resistor R32, a resistor R33, a resistor R34, and an operational amplifier A26. The operational amplifier A26 has an inverting input terminal, a non-inverting input terminal, and an output terminal.

The inverting input terminal of the operational amplifier A26 is connected with the resistors R31 and R32. The non-inverting input terminal of the operational amplifier A26 is connected with the resistors R33 and R34. The output terminal of the operational amplifier A26 is connected with the resistor R32 and the resistor R37 in the circuit 465. The second vertical potential-difference y2 is output from the output terminal of the operational amplifier A26. One of the terminals of the resistor R34 is connected with the power supply whose voltage is the reference voltage Vref.

The circuit 465 has a resistor R35, a resistor R36, a resistor R37, a resistor R38, and an operational amplifier A27. The operational amplifier A27 has an inverting input terminal, a non-inverting input terminal, and an output terminal.

The inverting input terminal of the operational amplifier A27 is connected with the resistors R35 and R36. The non-inverting input terminal of the operational amplifier A27 is connected with the resistors R37 and R38. The output terminal of the operational amplifier A27 is connected with the resistor R36. The second detected-position signal py, obtained by multiplying a predetermined amplification rate by the difference between the first vertical potential-difference y1 and the second vertical potential-difference y2, is output from the output terminal of the operational amplifier A27. One of the terminals of the resistor R38 is connected with the power supply whose voltage is the reference voltage Vref.

The values of the resistors R21 and R24 are the same. The values of the resistors R22, R23, R25, and R26 are the same. The values of the resistors R27~R34 are the same. The values of the resistors R35 and R37 are the same. The values of the resistors R36 and R38 are the same.

This predetermined amplification rate is based on the values of the resistors R35~R38.

The operational amplifiers A21~A24 are the same type of amplifier. The operational amplifiers A25 and A26 are the same type of amplifier.

The circuit 466 has a resistor R39 and an operational amplifier A28. The operational amplifier A28 has an inverting input terminal, a non-inverting input terminal, and an output terminal.

The inverting input terminal of the operational amplifier A28 is connected with the resistor R39 and one of the input terminals of the second vertical hall element hv2. The potential of the non-inverting input terminal of the operational amplifier A28 is set at voltage Vfy corresponding to the value of the current which passes through the input terminals of the first and second vertical hall elements hv1 and hv2. The output terminal of the operational amplifier A28 is connected with the one of the input terminals of the first vertical hall element hv1. The input terminal of the first vertical hall element hv1 and the input terminal of the second vertical hall element hv2 are connected in series. One of the terminals of the resistor R39 is grounded.

Figure 8:
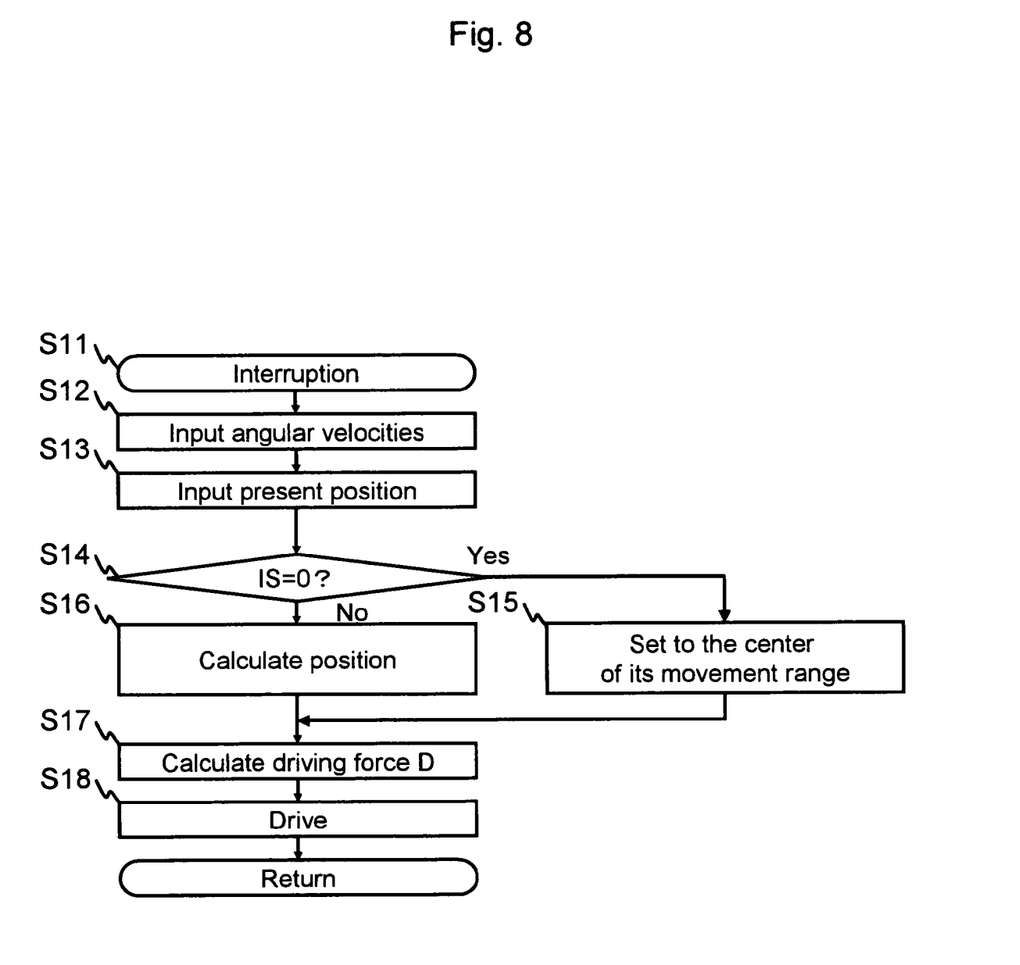
FIG. 8 is a flowchart of the anti-shake operation, which is performed at every predetermined time interval, as an interruption process.

Next, the flow of the anti-shake operation, which is performed at every predetermined time interval (1 ms) as an interruption process, independently of the other operations, is explained by using the flowchart in FIG. 8.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44b, so that the first detected-position signal px, which is calculated by the hall-element signal-processing circuit 45, is input to the A/D converter A/D 2 of the CPU 21 and is converted to a digital signal, and the second detected-position signal py, which is calculated by the hall-element signal-processing circuit 45, is input to the A/D converter A/D 3 of the CPU 21 and is converted to a digital signal. Therefore, the present position of the movable unit 30a P (pdx, pdy) is determined.

In step S14, it is judged whether the value of the IS is 0. When it is judged that the value of the IS is 0 (IS=0), in other words in the non anti-shake mode, the position S (sx, sy) of the movable unit 30a (the imaging unit 39a), which should be moved, is set to the center of its movement range, in step S15. When it is judged that the value of the IS is not 0 (IS=1), in other words in the anti-shake mode, the position S (sx, sy) of the movable unit 30a (the imaging unit 39a), which should be moved, is calculated on the basis of the first and second angular velocities vx and vy, in step S16.

In step S17, the driving force D, which drives the driver circuit 29 in order to move the movable unit 30a to the position S, in other words the first PWM duty dx and the second PWM duty dy, is calculated on the basis of the position S (sx, sy), which is determined in step S15 or step S16, and the present position P (pdx, pdy).

In step S18, the first driving coil 31a is driven by using the first PWM duty dx through the driver circuit 29, and the second driving coil 32a is driven by using the second PWM duty dy through the driver circuit 29, so that the movable unit 30a is moved.

The process in steps S17 and S18 is an automatic control calculation, which is used with the PID automatic control for performing general (normal) proportional, integral, and differential calculations.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor, or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2004-023481 (filed on Jan. 30, 2004), which is expressly incorporated herein by reference, in its entirety.

The invention claimed is:

1. An anti-shake apparatus of a photographing apparatus, comprising:
  a movable unit that has an imaging device and a position-detecting magnet, and can be moved in a first direction and a second direction; and
  a fixed unit that has a magnetic-field change-detecting unit;
  said first direction being perpendicular to an optical axis of a camera lens of said photographing apparatus;

said second direction being perpendicular to said optical axis and said first direction;

said position-detecting magnet being used for detecting a first location in said first direction of said movable unit and a second location in said second direction of said movable unit, and having a front-surface which faces said magnetic-field change-detecting unit;

said magnetic-field change-detecting unit having first and second horizontal magnetic-field change-detecting elements which are used for detecting said first location, and having first and second vertical magnetic-field change-detecting elements which are used for detecting said second location, and facing said position-detecting magnet; and said optical axis passing through a center area of said front-surface of said position-detecting magnet, when a center area of said imaging device is located on said optical axis.

2. The anti-shake apparatus according to claim 1, wherein said movable unit is located at the center of its movement range, in both said first and second directions, when said center area of said imaging device is located on said optical axis.

3. The anti-shake apparatus according to claim 2, wherein said front-surface of said position-detecting magnet is a square having peripheral sides which are parallel to one of said first direction and said second direction;

said position-detecting magnet has an N pole and an S pole, which are arranged in a third direction being parallel to said optical axis; and when the center of said imaging device passes through said optical axis, said first horizontal magnetic-field change-detecting element is located at a place which faces midway along a side of said square front-surface, in said second direction, of said position-detecting magnet; said second horizontal magnetic-field change-detecting element is located at a place which faces midway along another side of said square front-surface, in said second direction, of said position-detecting magnet; said first vertical magnetic-field change-detecting element is located at a place which faces midway along a side of said square front-surface, in said first direction, of said position-detecting magnet; and said second vertical magnetic-field change-detecting element is located at a place which faces midway along another side of said square front-surface, in said first direction, of said position-detecting magnet.

4. The anti-shake apparatus according to claim 1, wherein said movable unit has a plate;

said plate contacts said position-detecting magnet and said imaging device, and said plate is in a position between said position-detecting magnet and said imaging device in a third direction being parallel to said optical axis, and said plate is made of a metallic material.

5. The anti-shake apparatus according to claim 4, wherein said position-detecting magnet is a permanent magnet;

said plate is made of a magnetic material which is attracted by a magnetic force from said position-detecting magnet.

6. The anti-shake apparatus according to claim 1, wherein said fixed unit has a position-detecting yoke;

said position-detecting yoke is attached to a back surface side of said fixed unit, which is the opposite side to a surface having said magnetic-field change-detecting unit, and is made of a magnetic material.

7. The anti-shake apparatus according to claim 1, wherein said first and second horizontal magnetic-field change-detecting elements, and said first and second vertical magnetic-field change-detecting elements are one of hall elements, MI sensors, magnetic resonance-type magnetic-field detecting elements, and MR elements.

8. The anti-shake apparatus according to claim 1, wherein said magnetic-field change-detecting unit is a two-axes hall element; and said first and second horizontal magnetic-field change-detecting elements, and said first and second vertical magnetic-field change-detecting elements are hall elements.

* * * * *